US006999307B2

(12) United States Patent
Peng

(10) Patent No.: US 6,999,307 B2
(45) Date of Patent: Feb. 14, 2006

(54) DISK DRIVE ANCHORING MECHANISM

(75) Inventor: Chen-Hsing Peng, Taipei (TW)

(73) Assignee: Inventec Corporation, Taipei (TW)

( * ) Notice: Subject to any disclaimer, the term of this patent is extended or adjusted under 35 U.S.C. 154(b) by 193 days.

(21) Appl. No.: 10/697,022

(22) Filed: Oct. 31, 2003

(65) Prior Publication Data
US 2005/0094365 A1 May 5, 2005

(51) Int. Cl.
G06F 1/16 (2006.01)
(52) U.S. Cl. ..................... 361/685; 361/724
(58) Field of Classification Search ........... 361/685, 361/724–727; 312/223.1, 223.2
See application file for complete search history.

(56) References Cited

U.S. PATENT DOCUMENTS

| 5,192,143 | A | * | 3/1993 | Lajara et al. | 403/24 |
| 5,481,431 | A | * | 1/1996 | Siahpolo et al. | 361/685 |
| 6,075,695 | A | * | 6/2000 | Konno et al. | 361/685 |
| 6,256,195 | B1 | * | 7/2001 | Liao | 361/685 |
| 6,351,378 | B1 | * | 2/2002 | Chao et al. | 361/685 |
| 6,625,014 | B1 | * | 9/2003 | Tucker et al. | 361/685 |
| 6,795,309 | B2 | * | 9/2004 | Hartung et al. | 361/685 |
| 2002/0181197 | A1 | * | 12/2002 | Huang | 361/685 |

* cited by examiner

Primary Examiner—Lisa Lea-Edmonds
(74) Attorney, Agent, or Firm—Birch, Stewart, Kolasch & Birch

(57) ABSTRACT

A disk drive anchoring mechanism adopted for use on a computer casing includes fastening elements, a bracing board, latch flanges and a drawing rack. The fastening elements are located on two opposite sides of a disk drive. The bracing board is fixedly mounted on the computer casing for holding the disk drive. The latch flanges are located on the bracing board corresponding to the two opposite sides of the disk drive and sandwich the disk drive therebetween through the fastening elements. The drawing rack is movably coupled with the latch flanges to confine the fastening elements to anchor the disk drive. Thus the disk drive may be installed or removed rapidly with hands without using screw drives to save time.

5 Claims, 7 Drawing Sheets

DISK DRIVE ANCHORING MECHANISM

FIELD OF THE INVENTION

The invention relates to an anchoring mechanism adopted for use on a computer casing and particularly to a disk drive anchoring mechanism for installing or removing disk drives without using screw drives.

BACKGROUND OF THE INVENTION

The hardware equipment of computer systems mostly include a main board, various interface cards, a floppy disk drive, hard disk drive and an optical disk drive that are housed in a machine casing, which is generally called a computer casing. The computer casing usually has a housing compartment and a lid to seal the housing compartment. As the floppy disk drive, hard disk drive and optical disk drive are optional devices, to facilitate installation and future expansion, machine racks for the floppy disk drive, hard disk drive and optical disk drive generally are pre-configured in the computer casing. Through these machine racks users can remove or add equipment such as the floppy disk drive, hard disk drives and optical disk drive.

At present, screws are required for fastening disk drives. First, the disk drive is mounted onto the assembled machine rack, then the disk drive is fastened to the machine rack through screws. Such a fastening approach has many drawbacks. Notably while assembling the disk drive, workers at the production line have to use screw drives constantly to do fastening operations. The production process is complicated and tedious. It hampers production efficiency.

In view of the aforesaid disadvantages, to develop a disk drive anchoring mechanism to speed up installation and removal of disk drive without using screw drives to save time is essential.

SUMMARY OF THE INVENTION

Therefore the primary object of the invention is to provide a disk drive anchoring mechanism for installing or removing disk drives without using screw drives.

The disk drive anchoring mechanism of the invention is adopted for use on a computer casing. It includes fastening elements, a bracing board, latch flanges and a drawing rack. The fastening elements are screws engaging with screw holes formed on two opposite sides of a disk drive. The bracing board is fixedly mounted on the computer casing for holding the disk drive. The latch flanges are located on the bracing board corresponding to the two opposite sides of the disk drive and sandwich the disk drive therebetween through the fastening elements. The latch flanges have a guiding section. The drawing rack has a guiding slot corresponding to the guiding section to enable the drawing rack to move along the guiding section. Thereby the drawing rack may be moveably coupled with the latch flanges, to confine the fastening elements and anchor the disk drive.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus are not limitative of the present invention, and wherein:

DESCRIPTION OF THE PREFERRED EMBODIMENT

Figure 1:
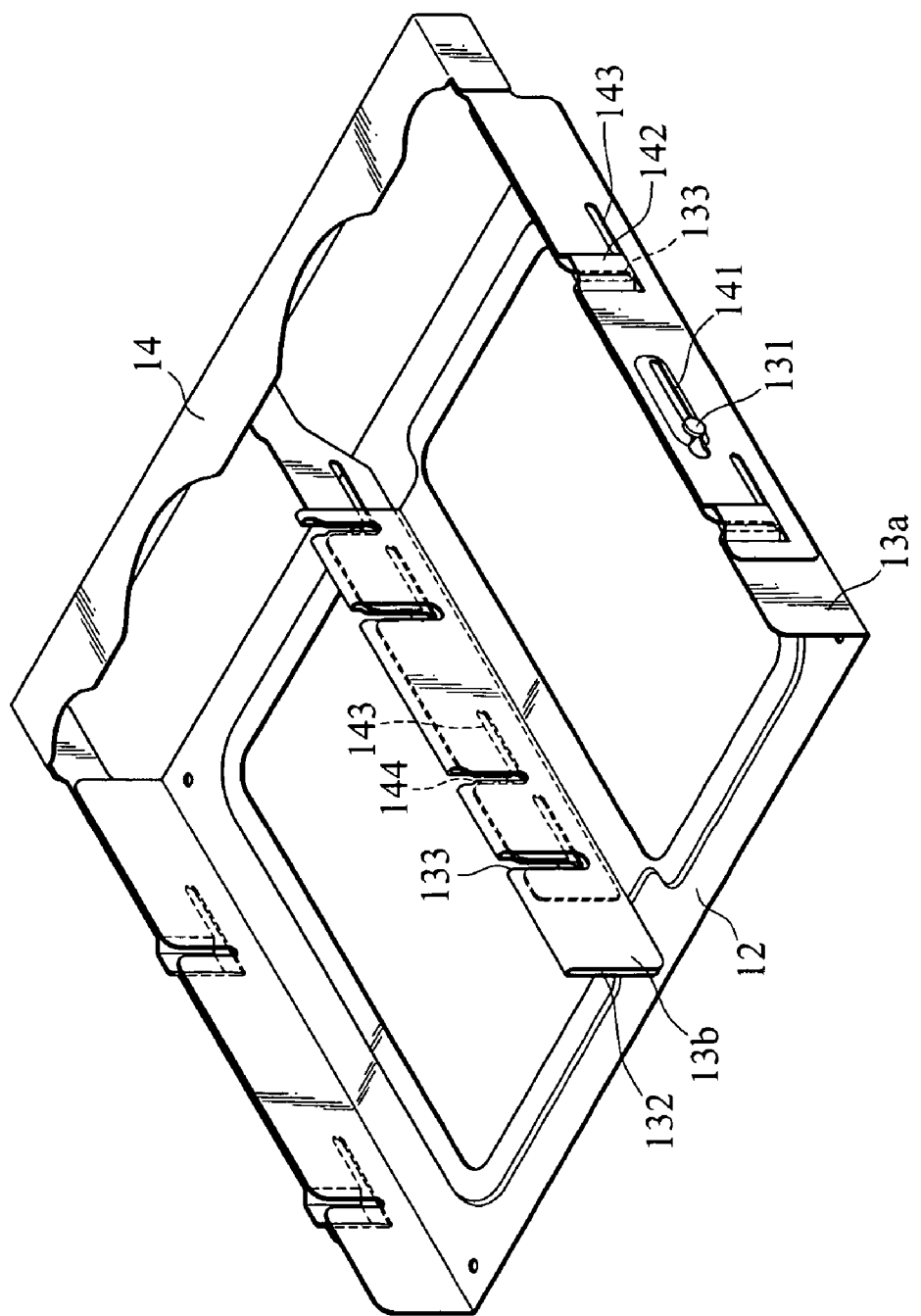
FIG. 1 is a perspective view of the invention.
Figure 2:
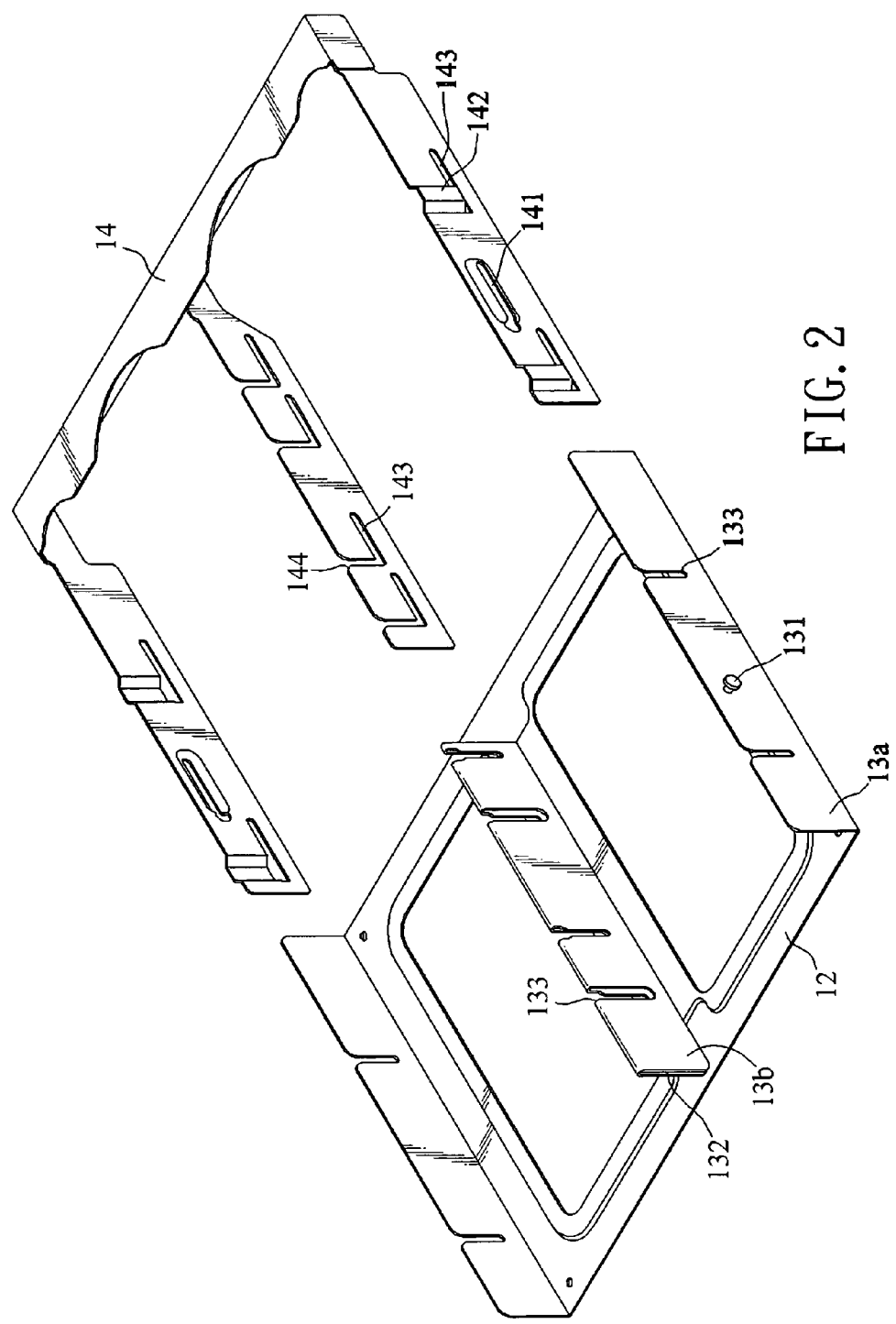
FIG. 2 is an exploded view of the invention.

Referring to FIGS. 1 through 6B, the disk drive anchoring mechanism of the invention is adopted for use on a computer casing 20. It includes fastening elements 11, a bracing board 12, latch flanges 13a and 13b, and a drawing rack 14.

Figure 4:
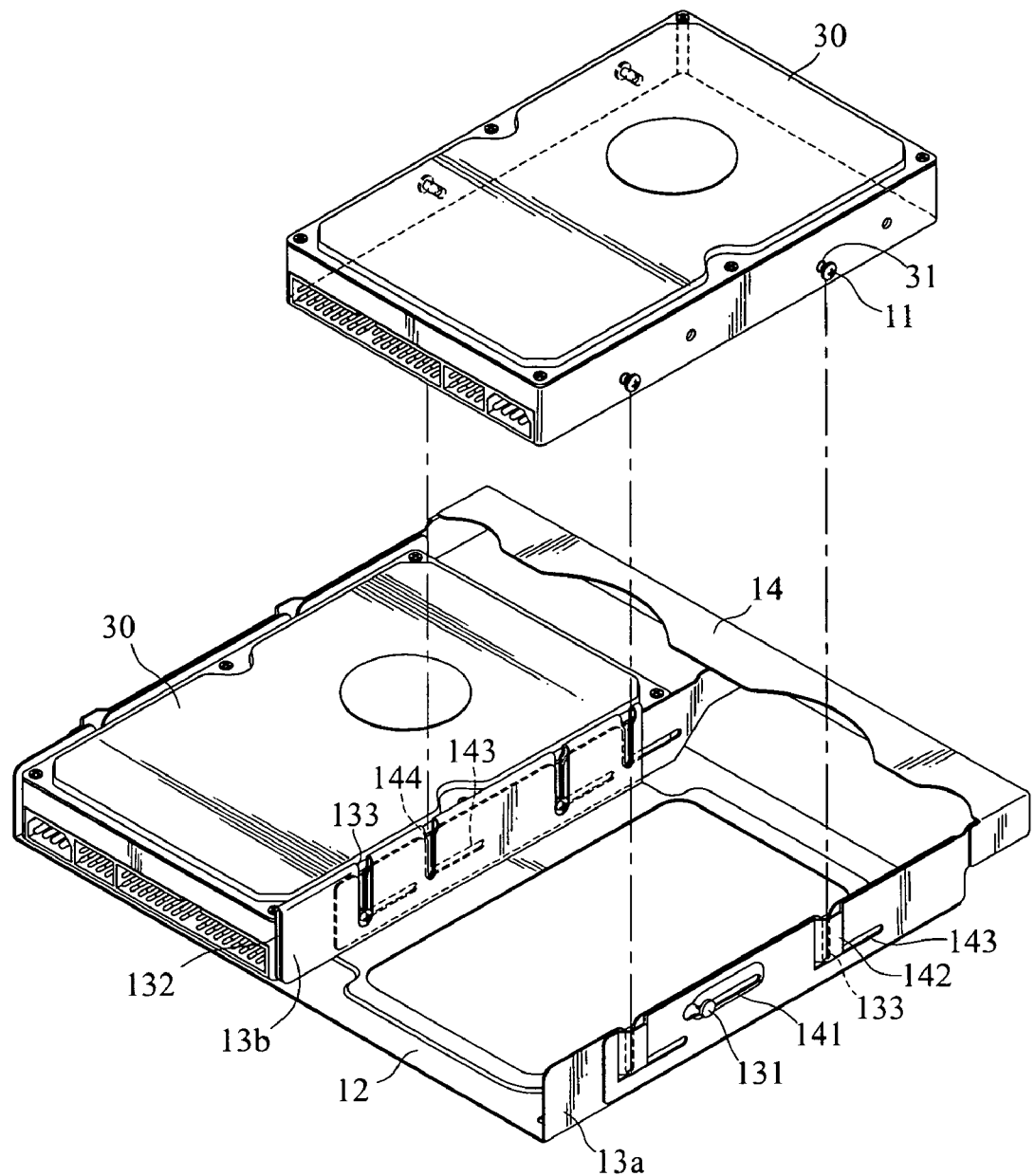
FIG. 4 is a schematic view of the invention showing a disk drive sandwiched between two latch flanges.

The fastening elements 11 are screws and fastened to screw holes 31 formed on two opposite sides of a disk drive 30 (as shown in FIG. 4).

Figure 3:
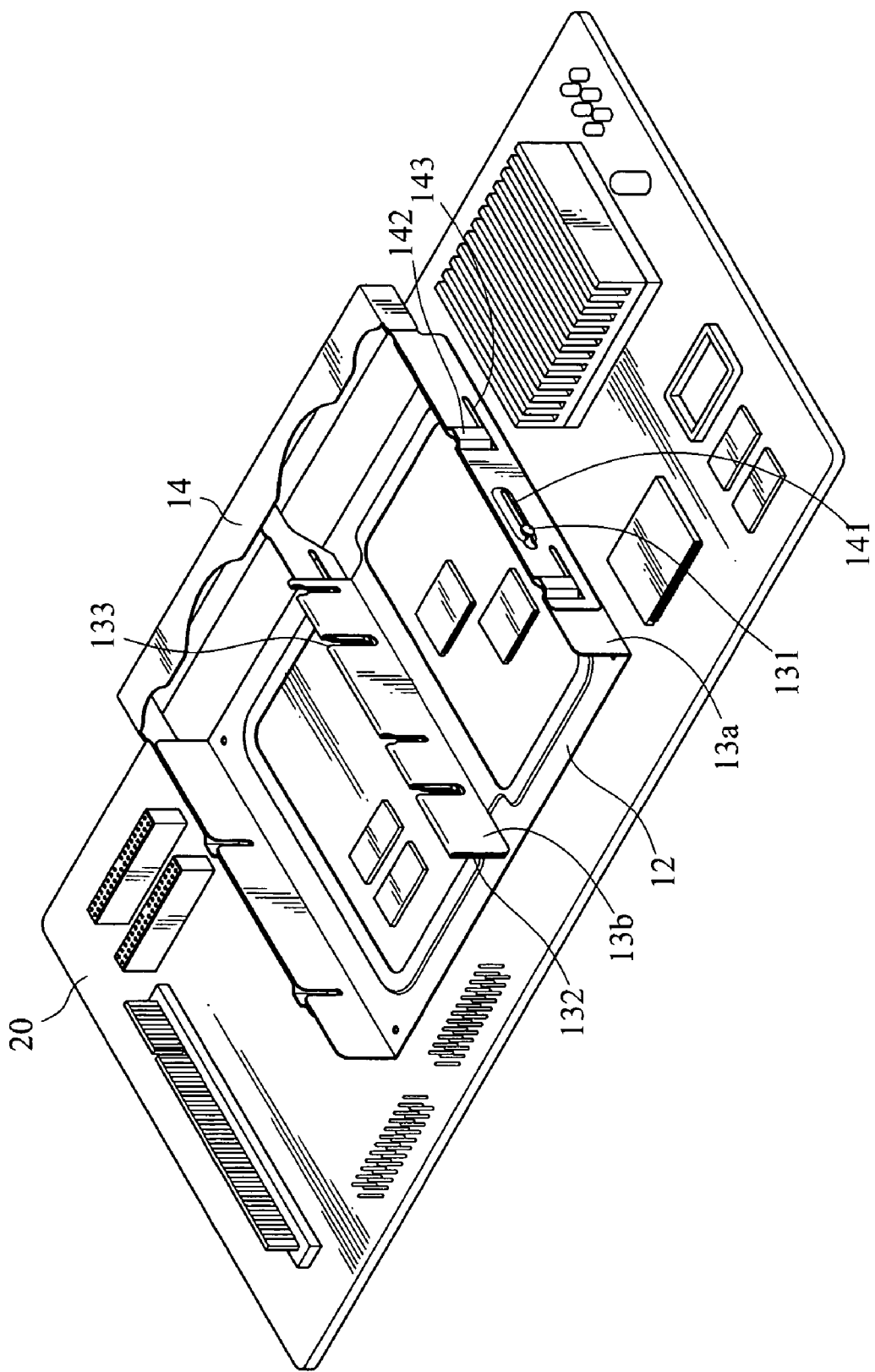
FIG. 3 is a schematic view of the invention showing the bracing board mounted on a computer casing.

The bracing board 12 is fixedly mounted on the computer casing 20 for holding the disk drive 30 (referring to FIG. 3).

Figure 5A:
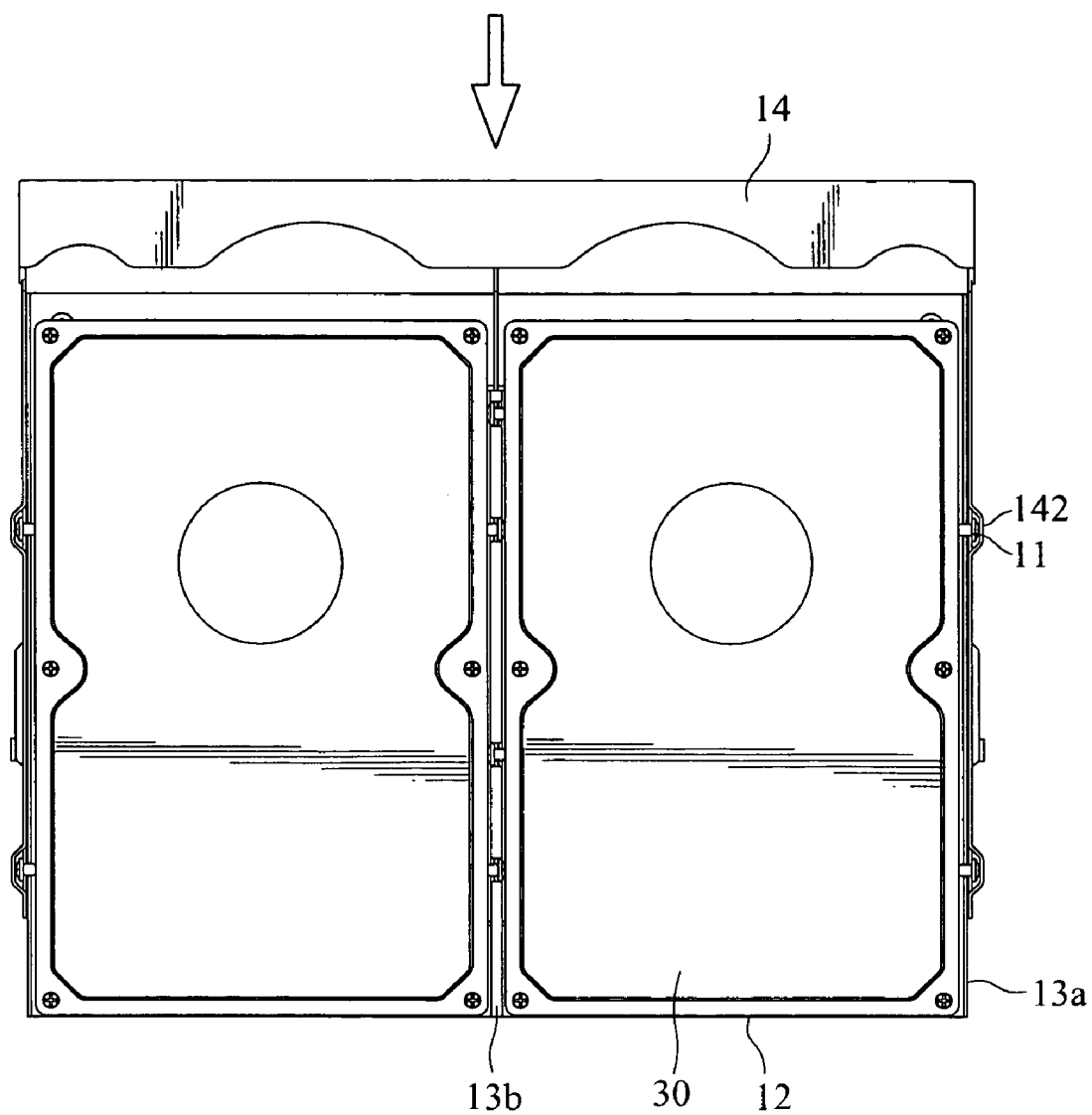
FIGS. 5A, 5B and 5C are schematic views of the invention showing the disk drive, sandwiched between two latch flanges, with the fastening elements unconfined by the drawing rack.
Figure 5B:
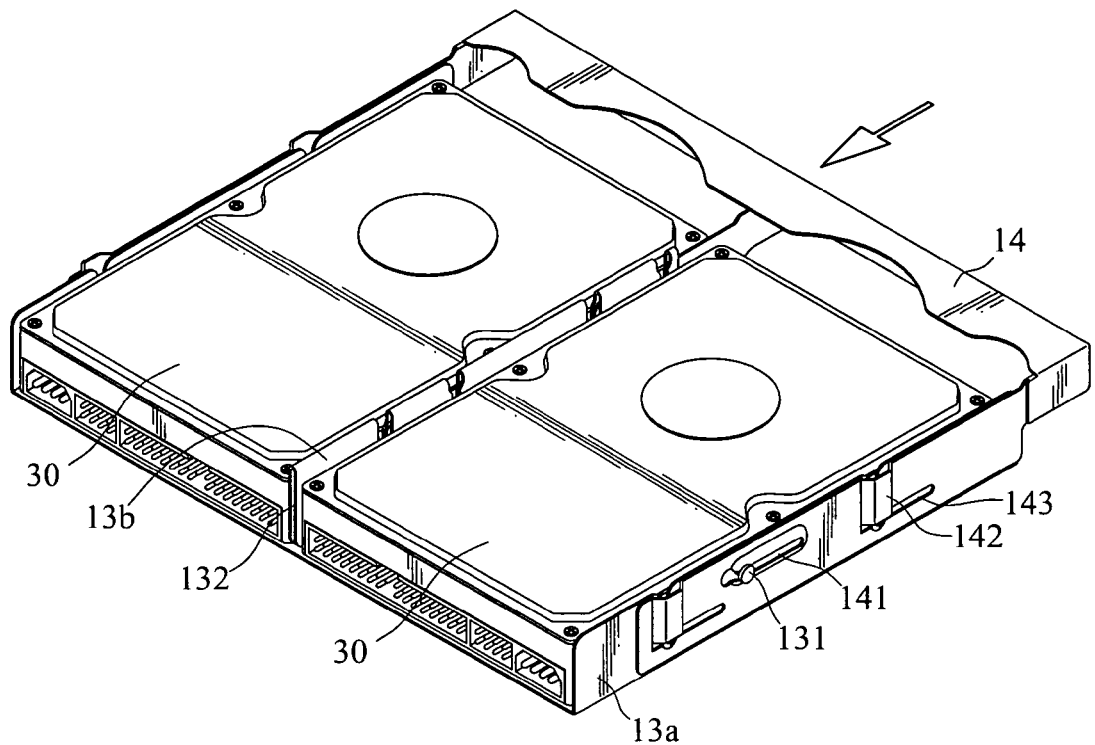
Figure 5C:
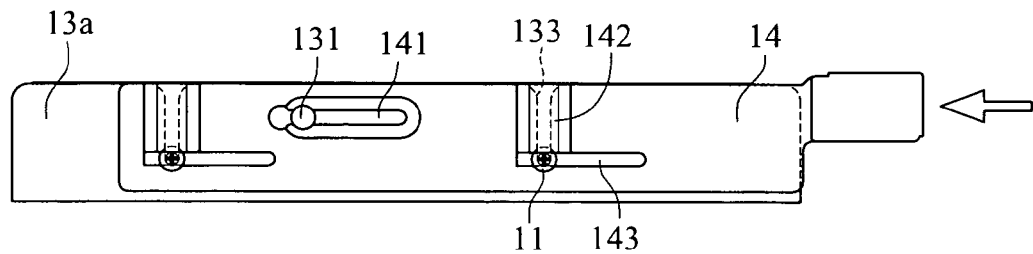
Figure 6A:
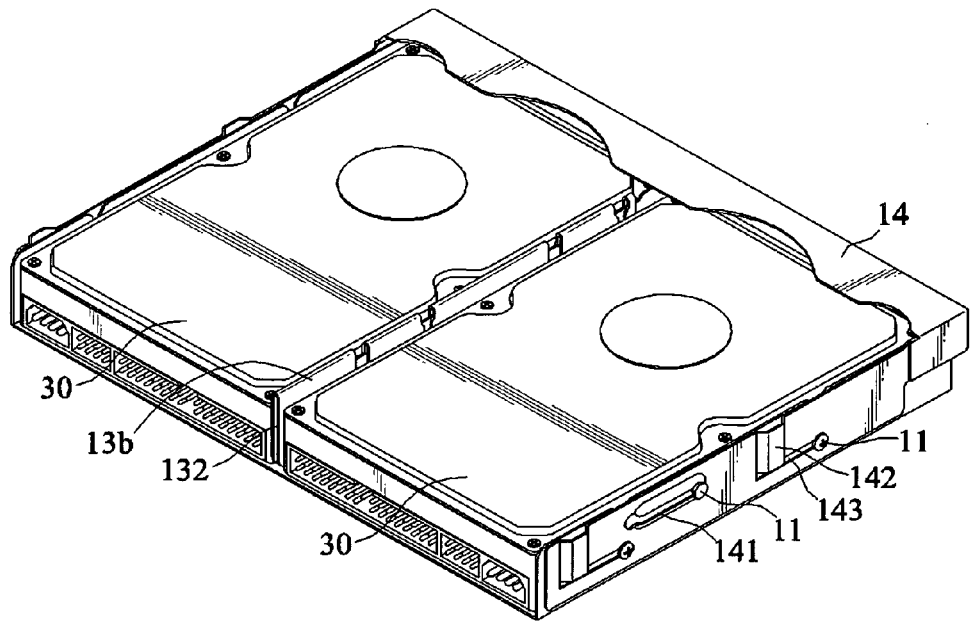
FIGS. 6A and 6B are schematic views of the invention showing the disk drive, sandwiched between two latch flanges, with the fastening elements confined by the drawing rack.
Figure 6B:
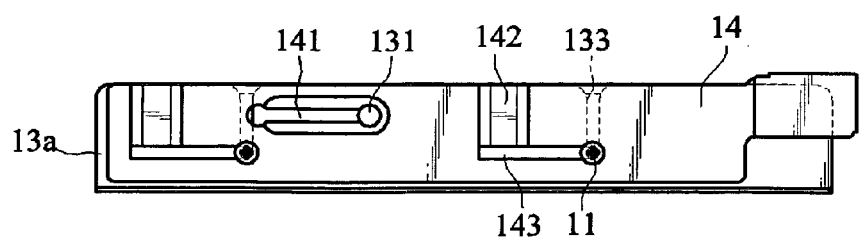

The latch flanges 13a and 13b are located on the bracing board 12 corresponding to the two opposite sides of the disk drive 30 to sandwich the disk drive 30 therebetween through the fastening elements 11 (referring to FIG. 5A). The first latch flange 13a has a guiding section 131, the second latch flange 13b has a housing section 132. The guiding section 131 and housing section 132 enable the drawing rack 14 to moveably couple with the latch flanges 13a and 13b.

The drawing rack 14 is moveably coupled with the latch flanges 13a and 13b to confine the fastening elements 11 to anchor the disk drive 30. The drawing rack 14 has a guiding slot 141 corresponding to the guiding section 131 such that the guiding slot 141 may be moved along the guiding section 131 to enable the drawing rack 14 to be movably coupled with the first latch flange 13a. The housing section 132 enables the drawing rack 14 to be movably coupled with the second latch flange 13b.

The first latch flange 13a has an anchor slot 133, and the drawing rack 14 has an indented trough 142, corresponding to the anchor slot 133 and a channel slot 143. The fastening element 11 may be slid into the bottom end of the anchor slot 133 and the channel slot 143 through the anchor slot 133 and the indented trough 142. As a result, that the drawing rack 14 may be moved along the channel slot 143 over the fastening element 11 to confine the fastening element 11 at the bottom end of the anchor slot 133, to anchor the disk drive 30.

The second latch flange 13b also has an anchor slot 133, and the drawing rack 14 has an open slot 144 corresponding to the anchor slot 133 and a channel slot 143 connecting to the bottom end of the open slot 144. The fastening element 11 may be slid into the bottom end of the open slot 144 and the channel slot 143 through the anchor slot 133 and the open slot 144. The drawing rack 14 may be moved along the channel slot 143 over the fastening element 11 to confine the fastening element 11 at the bottom end of the anchor slot 133, to anchor the disk drive 30.

Referring to FIGS. 4 through 6B, when in use, mount the disk drive 30 between the latch flanges 13a and 13b, with the fastening element 11 close to the first latch flange 13a sliding through the anchor slot 133 and indented trough 142 into the bottom end of the anchor slot 133 and the channel slot 143. The fastening element 11, close to the second latch flange 13b, has to slide through the anchor slot 133 and open slot 144 into the bottom ends of the anchor slot 133 and the open slot 144 and the channel slot 143. The disk drive 30 may be anchored between the latch flanges 13a and 13b through the fastening elements 11.

Moving the drawing rack 14 may be moved along the channel slot 143 over the fastening element 11, and through the anchor slot 133 and channel slot 143, the fastening element 11 may be confined to the bottom end of the anchor slot 133 to anchor the disk drive 30.

Thus by merely pushing the drawing rack 14, the disk drive 30 may be anchored rapidly with hands without using screw drives. That saves time.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments, which do not depart from the spirit and scope of the invention.

What is claimed is:

1. A disk drive anchoring mechanism adopted for use on a computer casing, comprising:
   a plurality of fastening elements located on two opposite sides of a disk drive;
   a bracing board fixedly mounted on the computer casing for holding the disk drive, wherein the disk drive and the plurality of fastening elements together are configured to be a disk drive module, and the disk drive module can selectively be removed from and anchored in the bracing board by bare hand;
   at least two latch flanges located on the bracing board corresponding to the two opposite sides of the disk drive and sandwiched the disk drive therebetween through the fastening elements; and
   a drawing rack movably coupled with the latch flanges to confine the fastening elements to anchor the disk drive.

2. A disk drive anchoring mechanism adopted for use on a computer casing, comprising:
   a plurality of fastening elements located on two opposite sides of a disk drive;
   a bracing board fixedly mounted on the computer casing for holding the disk drive;
   at least two latch flanges located on the bracing board corresponding to the two opposite sides of the disk drive and sandwiched the disk drive therebetween through the fastening elements; and
   a drawing rack movably coupled with the latch flanges to confine the fastening elements to anchor the disk drive,
   wherein the latch flanges have a guiding section, the drawing rack having a guiding slot corresponding to the guiding section, the guiding slot being movable along the guiding section to allow the drawing rack to be movably coupled with the latch flanges.

3. A disk drive anchoring mechanism adopted for use on a computer casing, comprising:
   a plurality of fastening elements located on two opposite sides of a disk drive;
   a bracing board fixedly mounted on the computer casing for holding the disk drive;
   at least two latch flanges located on the bracing board corresponding to the two opposite sides of the disk drive and sandwiched the disk drive therebetween through, the fastening elements; and
   a drawing rack movably coupled with the latch flanges to confine the fastening elements to anchor the disk drive,
   wherein the latch flanges have an anchor slot, the drawing rack having an indented trough corresponding to the anchor slot and a channel slot such that the fastening element is slidable into the bottom end of the anchor slot and the channel slot through the anchor slot and the indented trough, and the drawing rack is movable through the channel slot over the fastening element to confine the fastening element at the bottom end of the anchor slot to anchor the disk drive.

4. A disk drive anchoring mechanism adopted for use on a computer casing, comprising:
   a plurality of fastening elements located on two opposite sides of a disk drive;
   a bracing board fixedly mounted on the computer casing for holding the disk drive;
   at least two latch flanges located on the bracing board corresponding to the two opposite sides of the disk drive and sandwiched the disk drive therebetween through the fastening elements; and
   a drawing rack movably coupled with the latch flanges to confine the fastening elements to anchor the disk drive,
   wherein the latch flanges have a housing section to allow the drawing rack to be movably coupled with the latch flanges.

5. The disk drive anchoring mechanism of claim 4, wherein the latch flange has an anchor slot, the drawing rack having an open slot corresponding to the anchor slot and a channel slot connecting to the bottom end of the anchor slot such that the fastening element is slidable into the bottom ends of the anchor slot and the open slot, and the channel slot through the anchor slot and the open slot, and the drawing rack is movable through the channel slot over the fastening element to confine the fastening element at the bottom end of the anchor slot to anchor the disk drive.

* * * * *